(12) United States Patent
Kim et al.

(10) Patent No.: US 12,351,919 B2
(45) Date of Patent: Jul. 8, 2025

(54) PLATED STEEL SHEET HAVING EXCELLENT SEALER ADHESION AND METHOD FOR MANUFACTURING SAME

(71) Applicant: POSCO Co., Ltd, Pohang-si (KR)

(72) Inventors: Tae-Chul Kim, Gwangyang-si (KR);
Il-Ryoung Sohn, Gwangyang-si (KR);
Bong-Hwan Yoo, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/265,370

(22) PCT Filed: Dec. 20, 2021

(86) PCT No.: PCT/KR2021/019405
§ 371 (c)(1),
(2) Date: Jun. 5, 2023

(87) PCT Pub. No.: WO2022/139367
PCT Pub. Date: Jun. 30, 2022

(65) Prior Publication Data
US 2024/0052471 A1    Feb. 15, 2024

(30) Foreign Application Priority Data

Dec. 21, 2020  (KR) .................. 10-2020-0179787

(51) Int. Cl.
*C23C 2/02*     (2006.01)
*B32B 15/01*    (2006.01)
(Continued)

(52) U.S. Cl.
CPC ............ *C23C 2/024* (2022.08); *B32B 15/013* (2013.01); *C21D 1/84* (2013.01); *C21D 6/005* (2013.01);
(Continued)

(58) Field of Classification Search
None
See application file for complete search history.

(56) References Cited

U.S. PATENT DOCUMENTS 9,302,449 B2    4/2016 Kim et al.
2012/0282488 A1*  11/2012 Fujii .................. C23C 2/12
                                                    427/349
(Continued)

FOREIGN PATENT DOCUMENTS

EP    2876182 A1    5/2015
EP    3733921 A1    11/2020
(Continued)

OTHER PUBLICATIONS

International Search Report dated Mar. 11, 2022, issued in International Patent Application No. PCT/KR2021/018200 (with English translation).
(Continued)

*Primary Examiner* — Seth Dumbris
(74) *Attorney, Agent, or Firm* — Morgan Lewis & Bockius LLP

(57) ABSTRACT

The present invention relates to a plated steel sheet which can be used for automobiles, home appliances, building materials, etc. and a method for manufacturing same and, more particularly, to a zinc alloy plated steel sheet having excellent adhesion to an adhesive and a method for manufacturing same.

4 Claims, 4 Drawing Sheets

(51) Int. Cl.
*C21D 1/84* (2006.01)
*C21D 6/00* (2006.01)
*C21D 9/46* (2006.01)
*C22C 18/04* (2006.01)
*C22C 38/00* (2006.01)
*C22C 38/02* (2006.01)
*C22C 38/04* (2006.01)
*C22C 38/06* (2006.01)
*C23C 2/06* (2006.01)
*C23C 2/20* (2006.01)
*C23C 2/26* (2006.01)
*C23C 2/40* (2006.01)

(52) U.S. Cl.
CPC .............. *C21D 6/008* (2013.01); *C21D 9/46* (2013.01); *C22C 18/04* (2013.01); *C22C 38/002* (2013.01); *C22C 38/02* (2013.01); *C22C 38/04* (2013.01); *C22C 38/06* (2013.01); *C23C 2/0222* (2022.08); *C23C 2/0224* (2022.08); *C23C 2/06* (2013.01); *C23C 2/20* (2013.01); *C23C 2/26* (2013.01); *C23C 2/40* (2013.01)

(56) References Cited

U.S. PATENT DOCUMENTS

| | | | |
|---|---|---|---|
| 2013/0183541 A1* | 7/2013 | Kim | B32B 15/013 427/349 |
| 2013/0295410 A1 | 11/2013 | Takahashi et al. | |
| 2018/0320260 A1* | 11/2018 | Oh | C23C 2/20 |
| 2019/0100831 A1* | 4/2019 | Oh | C23C 2/261 |
| 2019/0315977 A1 | 10/2019 | Kim et al. | |
| 2020/0340086 A1 | 10/2020 | Han et al. | |
| 2021/0010123 A1 | 1/2021 | Sohn et al. | |
| 2021/0214830 A1 | 7/2021 | Kim | |

FOREIGN PATENT DOCUMENTS

| | | |
|---|---|---|
| JP | H11-279733 A | 10/1999 |
| JP | 2011-157579 A | 8/2011 |
| JP | 2012-117148 A | 6/2012 |
| KR | 10-2013-0133358 A | 12/2013 |
| KR | 10-2015-0049488 A | 5/2015 |
| KR | 10-2017-0049422 A | 5/2017 |
| KR | 10-1934524 B1 | 1/2019 |
| KR | 10-1940882 B1 | 1/2019 |
| KR | 10-2019-0077189 A | 7/2019 |
| KR | 10-2019-0078435 A | 7/2019 |
| WO | WO-2019132337 A1 * | 7/2019 ........... B32B 15/013 |

OTHER PUBLICATIONS

European Search Report dated Sep. 27, 2023 issued in European Patent Application No. 21911434.5.

* cited by examiner

[Fig.1]
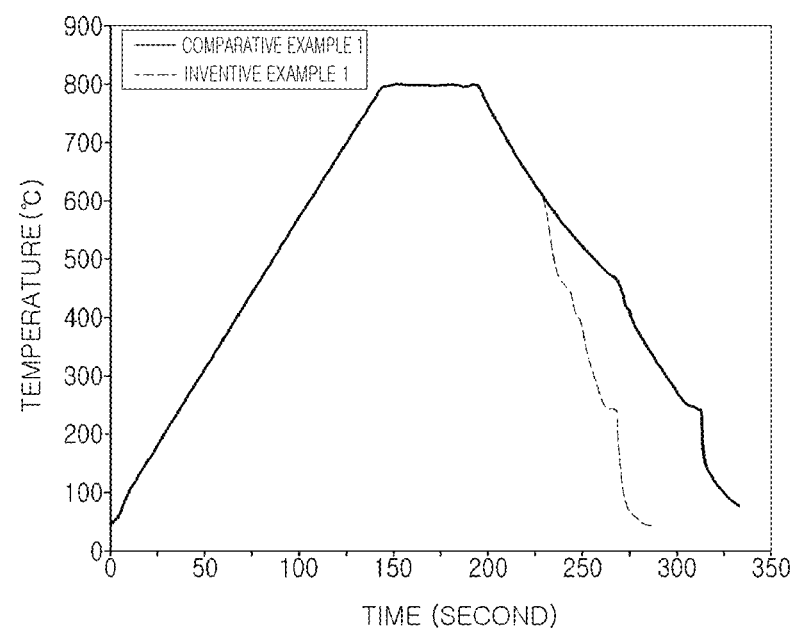

[Fig.2]
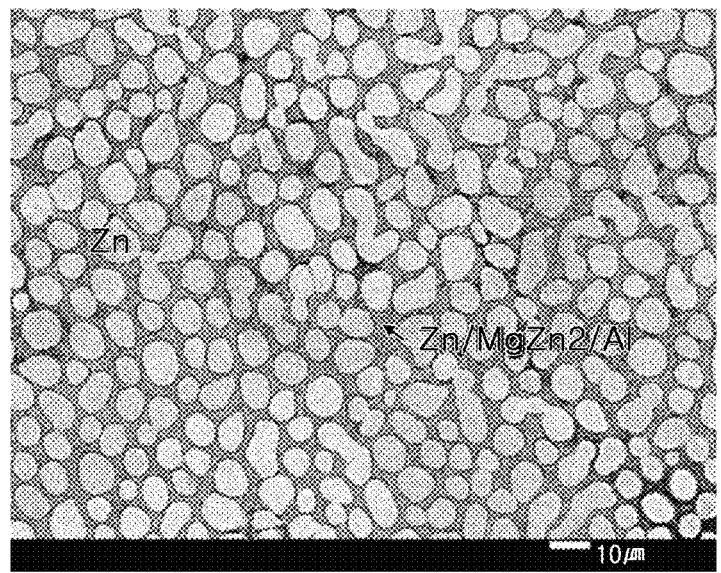
[Fig.3]
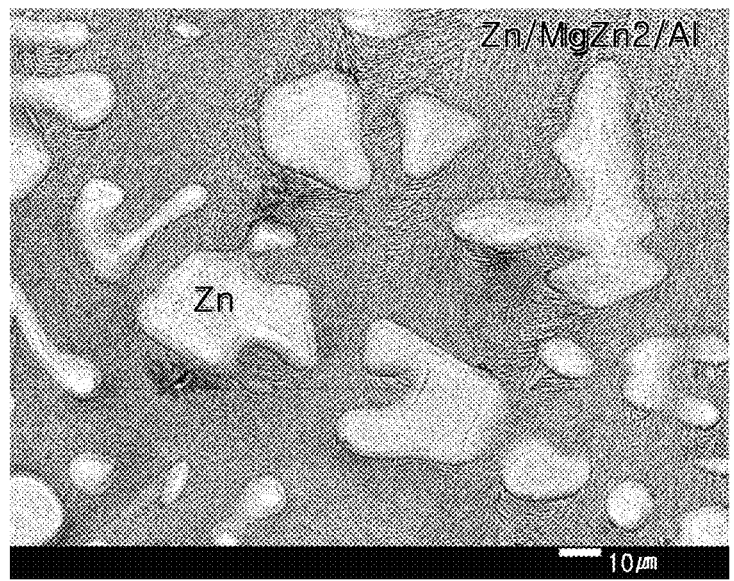

[Fig.4]
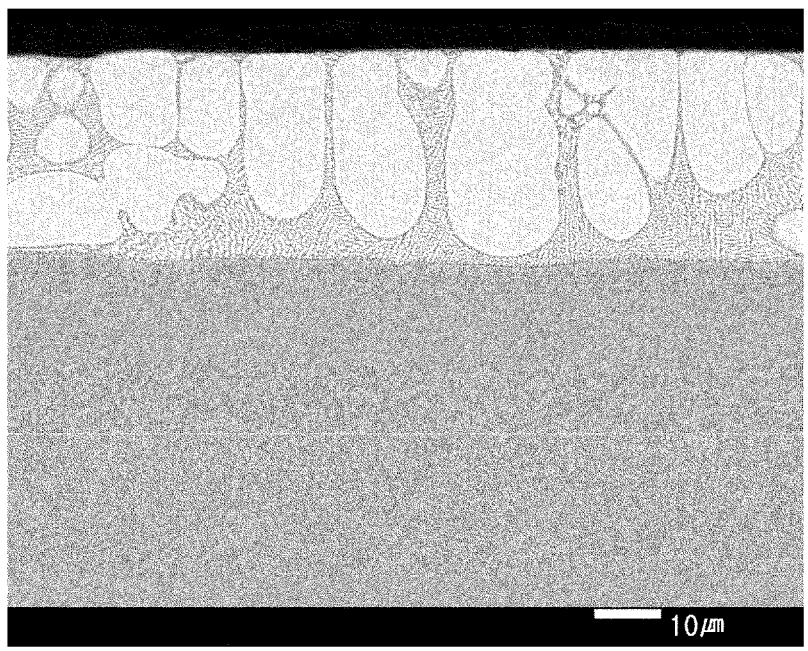

[Fig.5]
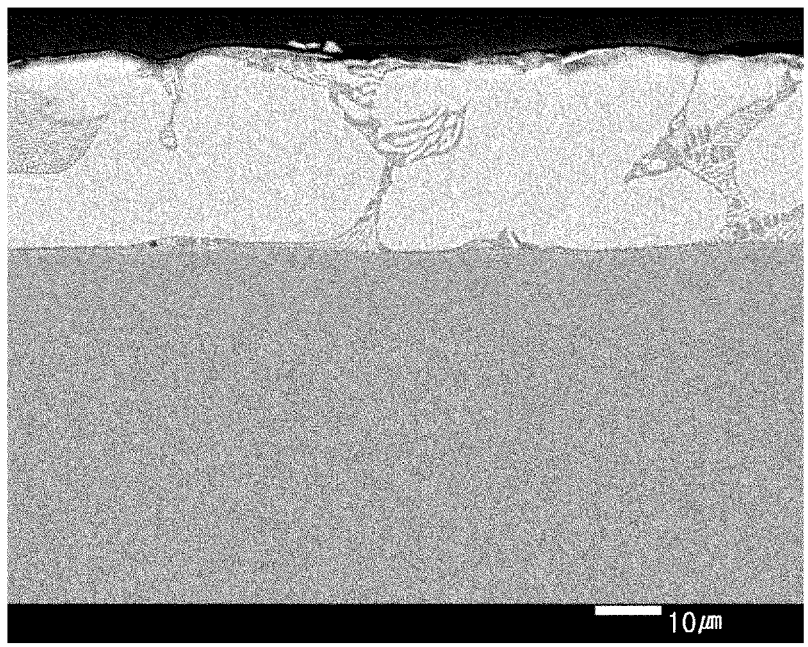

PLATED STEEL SHEET HAVING EXCELLENT SEALER ADHESION AND METHOD FOR MANUFACTURING SAME

CROSS-REFERENCE OF RELATED APPLICATIONS

This application is the U.S. National Phase under 35 U.S.C. § 371 of International Patent Application No. PCT/KR2021/019405, filed on Dec. 20, 2021, which in turn claims the benefit of Korean Application No. 10-2020-0179787, filed on Dec. 21, 2020, the disclosures of which applications are incorporated by reference herein.

TECHNICAL FIELD

The present disclosure relates to a plated steel sheet having excellent sealer adhesion and a method for manufacturing the same.

BACKGROUND ART

A galvanizing method, which inhibits corrosion of iron through a cathodic protection system, is widely used to manufacture steel materials having high corrosion resistance due to its excellent anticorrosion performance and economic feasibility. In particular, a hot-dip galvanized steel material, which forms a plating layer by immersing steel materials in molten zinc, has a simpler manufacturing process than an electro-galvanized steel material and is inexpensive, so a demand for the hot-dip galvanized steel material is increasing throughout industries such as automobiles, home appliances, and building materials.

A zinc-plated hot-dip galvanized steel material has characteristics of sacrificial corrosion protection, in which, when exposed to a corrosive environment, zinc, which has a lower oxidation-reduction potential than iron, first corrodes and thus corrosion of a steel material is inhibited. In addition, as the zinc in the plating layer is oxidized, a dense corrosion product is formed on a surface of the steel material to block the steel material from the oxidizing atmosphere, to thereby improve the corrosion resistance of the steel material.

However, air pollution and deterioration in corrosive environment are increasing due to industrial advancement, and the need to develop steel materials having better corrosion resistance than the conventional galvanized steel material is increasing due to strict regulations on resource and energy saving.

As part of this, various studies have been conducted on a manufacturing technology of a zinc-alloy-based plated steel material to improve corrosion resistance of steel materials by adding elements such as aluminum (Al) and magnesium (Mg) to a galvanizing bath. As a representative zinc-alloy-based plating material, research on a manufacturing technology of Zn—Al—Mg-based plated steel sheet in which Mg is additionally added to a Zn—Al plating composition system is being actively conducted.

However, the Zn—Al—Mg-based plated steel sheet has the following disadvantages.

First, the Zn—Al—Mg-based plated steel sheet has a possibility of being inferior to a general galvanized steel sheet in terms of adhesion with an adhesive (sealer) due to the formation of MgO-based oxide on a surface layer. Recently, the bonding of automobile steel materials is often in progress by using spot welding and adhesive attachment together. Therefore, the importance of securing the adhesion between the adhesive and the steel sheet is gradually emerging. When the adhesion between the adhesive and the steel sheet is not secured, adhesive failure occurs at a contact surface between the steel sheet and the adhesive, and when the adhesion between the steel sheet and the adhesive is sufficient, cohesive failure appears in the adhesive. There are two main methods to improve adhesion. It is necessary to develop an adhesive suitable for a highly corrosion-resistant plated steel sheet or to change a structure of a surface of a highly corrosion-resistant plating layer.

The first method has the disadvantage of increasing processing costs since a new adhesive should be applied to the existing bonding process for automobiles and thus R&D costs, additional processes, etc., are required, and may take a long time to develop. Accordingly, there is a need to develop a technology of securing adhesion while using an adhesive which is being used in the conventional hot-dip galvanizing. There are various methods that have been developed in the past. In order to prevent a direct reaction between MgO on the surface of the highly corrosion-resistant steel sheet and the adhesive, there is a method of securing adhesion with an adhesive by adding a resin coating post-treatment process after completion of plating to change characteristics of an interface. The above method has a disadvantage of increasing production costs due to the need for an additional post-treatment process, and performing a cumbersome operation of removing post-treatment materials at additional process costs in the automobile manufacturing process. As another method, there is a case where a surface layer is slightly pickled in hydrochloric acid after plating. The method is a method of discarding MgO oxide of a surface layer and forming a plating layer of metal on the surface layer, which also has the disadvantage of incurring additional auxiliary facilities and costs.

In addition to the chemical interface modification method, there is also a method of physically changing a surface of a highly corrosion-resistant steel sheet. The first method is a method of destroying MgO-based oxide formed on a surface layer by applying a skin pass mill with hard chrome coating to perform a reaction between an adhesive and a metallic plating layer of a lower layer of the MgO oxide. However, the above method has a risk of causing other surface defects such as dents due to excessive pressing of the skin pass mill. Another method is a method of removing MgO oxide on a surface layer after plating by mechanical brushing. However, the above method may cause scratches on the surface, and has the disadvantage in that it is difficult to remove residues formed after polishing, and an additional equipment investment is required because a polishing brush and rinse equipment are additionally required.

Therefore, it is very necessary to secure surface quality with excellent adhesion without specially changing a process, but no technology has been developed to meet such advanced demand.

(Patent Document 1) Korean Patent Laid-Open Publication No. 2013-0133358

DISCLOSURE

Technical Problem

The present disclosure provides a plated steel sheet having excellent adhesion with an adhesive and a method for manufacturing the same.

The object of the present disclosure is not limited to the foregoing. Those skilled in the art to which the present disclosure pertains will have no difficulty in understanding the additional objects of the present disclosure from the contents throughout the present specification.

Technical Solution

In an aspect of the present disclosure, a plated steel sheet may include:
base iron;
a Zn—Mg—Al-based plating layer provided on at least one surface of the base iron; and
a Fe—Al-based inhibition layer provided between the base iron and the Zn—Mg—Al-based plating layer,
in which the plating layer contains, by wt %, Mg: 1.0 to 2.0%, Al: 1.0 to 3.0%, a balance of Zn, and other unavoidable impurities,
a ratio of a Zn single phase on a surface of the plating layer is 50% or more as an area fraction, and
an average diameter of the Zn single phase on the surface of the plating layer was 3 to 20 µm.

In another aspect of the present disclosure, a method for manufacturing a plated steel sheet may include:
after preparing the base iron, performing annealing heat treatment the base iron at a temperature of 800° C. or higher;
primary cooling the annealing heat-treated base iron from 800° C. to 600° C. at an average cooling rate of 2 to 5° C./s;
secondary cooling the primary cooled base iron at an average cooling rate of 13 to 25° C./s from 600° C. to a plating bath temperature;
hot-dip galvanizing the secondary cooled base iron by immersing the secondary cooled base iron in a plating bath containing, by wt %, Mg: 1.0 to 2.0%, Al: 1.0 to 3.0%, a balance of Zn, and other unavoidable impurities; and
after the hot-dip galvanizing, cooling at an average cooling rate of 6 to 20° C./s to a top roll section after starting cooling from the plating bath molten surface.

Advantageous Effects

As set forth above, according to an aspect of the present disclosure, it is possible to provide a plated steel sheet having excellent adhesion with an adhesive and a method for manufacturing the same.

Various and beneficial advantages and effects in the present disclosure are not limited to the above description, and may be more easily understood in the course of describing the specific example embodiments in the present disclosure.

BRIEF DESCRIPTION OF DRAWINGS

FIG. 1 is a comparison diagram of temperature rising and cooling temperature curves of a steel sheet of Inventive Example 1 and Comparative Example 1.

FIG. 2 is a SEM 700-fold image of a surface of a plated steel sheet according to Inventive Example 1.

FIG. 3 is an SEM 700-fold image of the surface of the plated steel sheet according to Comparative Example 1.

FIG. 4 is an SEM 1,000-fold image of a cross section of the plated steel sheet in a thickness direction according to Inventive Example 1.

FIG. 5 is an SEM 1,000-fold image of a cross section of a plated steel sheet in a thickness direction according to Comparative Example 1.

BEST MODE

Terms used herein are to mention only a specific exemplary embodiment, and are not to limit the present disclosure. In addition, singular forms used herein include the plural forms unless the relevant definition clearly dictates the contrary.

The meaning of "comprising" as used in the specification specifies a component, and does not exclude the presence or addition of other components.

Unless defined otherwise, all terms including technical terms and scientific terms used herein have the same meaning as commonly understood by a person of ordinary skill in the art to which the present disclosure belongs. The terms defined in the dictionary are interpreted to have a meaning consistent with the related technical literature and the currently disclosed content.

Hereinafter, a plated steel sheet according to an aspect of the present disclosure will be described in detail. In the present disclosure, when indicating the content of each element, it means weight % unless otherwise specifically defined.

The conventional Zn—Mg—Al-based plated steel sheet has excellent corrosion resistance compared to a Zn-based plated steel sheet, but has a problem in that adhesion with a sealer formed on a surface of the plating layer is poor due to the formation of oxides of Mg and Al present on the surface of the Zn-based plated steel sheet.

Therefore, the inventors of the present disclosure have excellent corrosion resistance and at the same time, as a result of intensive examination to improve the adhesion between the plating layer and the adhesive such as the sealer, found that the microstructure on the surface of the plating layer is a very important factor and have completed the present disclosure. Hereinafter, the present disclosure will be described in detail.

A plated steel sheet according to an aspect of the present disclosure includes base iron, and a Zn—Mg—Al-based plating layer provided on at least one surface of the base iron.

In the present disclosure, the type of the base iron is not particularly limited. For example, as the base iron, Fe-based base iron (i.e., hot-rolled steel sheet or cold-rolled steel sheet) used as the base iron of the conventional zinc-based or zinc alloy plated steel sheet may be used.

Alternatively, as the base iron, carbon steel, ultra-low carbon steel, high manganese steel, or the like used as a material for construction, home appliances, automobiles, and wire rods may be applied without limitation. As a non-limiting example, the base iron may include base iron containing, by wt %, C: greater than 0% and 0.17% or less, Si: greater than 0% and 1.5% or less, Mn: 0.01 to 2.7%, P: greater than 0% and 0.07% or less, S: greater than 0% and 0.015% or less, Al: greater than 0% and 0.5% or less, Nb: greater than 0% and 0.06% or less, Cr: 1.1% or less (including 0%), Ti: greater than 0% and 0.06% or less, B: greater than 0% and 0.03% or less, the balance Fe, and other unavoidable impurities.

In the plated steel sheet, the Zn—Mg—Al-based plating layer may be formed on only one side of the base iron or on both sides of the base iron. In this case, the Zn—Mg—Al-based plating layer means a plating layer that includes Mg and Al made of a Zn—Mg—Al-based alloy, but has an excess of Zn.

Specifically, the Zn—Mg—Al-based plating layer contains, by wt %, Mg: 1.0 to 2.0%, Al: 1.0 to 3.0%, a balance of Zn, and other unavoidable impurities. Hereinafter, the reason for adding each component and the reason for limiting the content in the Zn—Mg—Al-based plating layer will be described.

Mg: 1.0 to 2.0%

Mg in the zinc alloy plating layer is an element that serves to improve the corrosion resistance of the plating steel material. When the content is too low, there is a problem in that the corrosion resistance improvement effect is insignificant. Therefore, the lower limit of the Mg content in the zinc alloy plating layer is preferably 1.0% by weight, and more preferably 1.2 wt %. However, when the content is excessive, a large amount of MgO-based oxide may be formed on the surface layer of the plating layer because a lot of coarse $MgZn_2$ phase is induced to form the distribution of $Zn/MgZn_2$ binary phase on the surface layer due to Mg oxidation in the plating bath, so a large amount of MgO-based oxide may be formed on the surface of the plating layer. Therefore, the upper limit of the Mg content in the zinc alloy plating layer is preferably 2.0 wt %.

Al: 1.0 to 3.0%

Al in the zinc alloy plating layer is an element that serves to inhibit Mg oxide. When the content is too low compared to the Mg content, the effect of preventing Mg oxidation in the plating bath is insignificant. Therefore, the lower limit of the Al content in the zinc alloy plating layer is preferably 1.0 wt %. However, when the content is excessive, there is a problem of increasing a melting temperature of the plating bath. When the temperature of the plating bath is high, it causes erosion of the plating bath or internal equipment, excessive ash generation, or the like. Therefore, the upper limit of the content of Al in the zinc alloy plating layer is preferably 3.0 wt %, resulting in inducing the formation of a fine $Zn/MgZn_2/Al$ ternary eutectic structure on the surface layer of the plating layer. Meanwhile, in terms of further improving the above-described effect, the lower limit of the content of Al may be 1.5%, and the upper limit of the content of Al may be 2.5%.

Content Ratio of Mg/Al: 0.6 to 0.9

Additionally, it is necessary to bring the content of Al higher than the content of Mg in order to form a lot of ternary eutectic structures in the plating layer. The content ratio of Mg/Al should be adjusted to 0.6 or more and 0.9 or less to obtain a beautiful plated product with high ternary phase distribution. Meanwhile, in terms of further improving surface quality, the lower limit of the content ratio of the Mg/Al may be 0.67, or the upper limit of the content ratio of the Mg/Al may be 0.88.

A Balance of Zn and Other Unavoidable Impurities

In addition to the composition of the plating layer described above, the balance may be Zn and other unavoidable impurities. The unavoidable impurities may be included as long as they may be unintentionally mixed in the manufacturing process of a typical molten zinc-based or zinc-alloy-based plated steel sheet, and since those skilled in the art may easily understand the meaning, the present disclosure is not particularly limited thereto. In this case, the Zn—Mg—Al-based plating layer may contain a small amount of iron (Fe) component diffused from the base iron, but in the present disclosure, the iron (Fe) is not defined separately because it corresponds to the level of an impurity whose content is extremely small.

Meanwhile, in the plated steel sheet, a Fe—Al-based inhibition layer (so-called inhibition layer) is formed between the base iron and the Zn—Mg—Al-based plating layer. The Fe—Al-based inhibition layer is a layer (or a layer composed of an intermetallic compound of Fe and Al) containing an intermetallic compound of Fe and Al, and examples of the intermetallic compound of Fe and Al may include $FeAl$, $FeAl_3$, $Fe_2Al_5$ and the like.

In this case, the Fe—Al-based inhibition layer may include, by wt %, Fe: 30 to 50%, Al: 50 to 70%, and descriptions commonly applied in the art may be equally applied to the Fe—Al-based inhibition layer. That is, the Fe—Al-based inhibition layer may further include (for example, 40% or less) some of components derived from the plating layer, such as Zn, Mg, and Si, in addition to Fe and Al. This Fe—Al-based inhibition layer is a layer formed by alloying by Fe diffused from the base iron in the initial stage of plating and the plating bath components. The Fe—Al-based inhibition layer serves as an inhibition layer to not only improve the adhesion between the base iron and the Zn—Mg—Al-based plating layer, but also prevent the Fe diffusion from the base iron to the Zn—Mg—Al-based plating layer.

According to an aspect of the present disclosure, the thickness of the Fe—Al-based inhibition layer may range from 20 to 100 nm. The lower limit of the thickness of the Fe—Al-based inhibition layer may be 20 nm in order to prevent alloying and to secure corrosion resistance. However, since the inhibition layer is a brittle layer, the inhibition layer may adversely affect processability, so the upper limit of the thickness of the Fe—Al-based inhibition layer may be 100 nm. In this case, the thickness of the Fe—Al-based inhibition layer may mean a minimum thickness in the thickness direction (direction perpendicular to the rolling direction) from the interface with the base steel sheet.

In the present disclosure, the microstructure of the Zn—Mg—Al-based plating layer is not particularly limited, but may include a Zn single phase, a $Zn—MgZn_2$ phase (i.e., $Zn/MgZn_2$ binary eutectic structure) and a $Zn—MgZn_2—Al$ phase (i.e., $Zn/MgZn_2/Al$ ternary eutectic structure). In addition, a $MgZn_2$ phase, an Al—Zn phase, and the like may be further included as other phases.

As a method of confirming a microstructure of a Zn—Mg—Al-based plating layer, there is a method of using a scanning electron microscope (SEM) or a transmission electron microscope (TEM) by enlarging a cross-sectional magnification of a plating layer.

In the present disclosure, the Zn single phase is a phase mainly composed of Zn, and specifically means a phase containing 95 wt % or more of Zn. That is, the Zn single phase means a phase in which Al, Mg, etc., which may be included as plating layer components other than Zn, are dissolved at 5% or less (including 0%) or precipitated in the Zn single phase, and the balance means a phase that is Zn. In addition, the $Zn—MgZn_2—Al$ phase means a ternary eutectic phase including all of the Zn phase, the $MgZn_2$ phase, and the Al phase. In addition, the $MgZn_2$ phase means a phase mainly composed of $MgZn_2$, the $Zn—MgZn_2$ phase means a binary eutectic phase that has a lamellar structure including the Zn phase and the $MgZn_2$ phase, and the Al—Zn phase means a binary eutectic phase that has a lamellar structure including the Al phase and the Zn phase or a mixed structure of an Al phase and a Zn phase having a fine diameter. Here, matters commonly known in the art may be equally applied to the Zn single phase and the $Zn—MgZn_2—Al$ phase unless the object of the present disclosure is impaired, and may be equally applied to the above-described $MgZn_2$ phase, $Zn—MgZn_2$ phase and Al—Zn phase.

According to the present disclosure, the ratio of the Zn single phase on the surface of the plating layer may be 50% or more (excluding 100%) and more preferably 50 to 90% as an area fraction. When the ratio of the Zn single phase on the surface of the plating layer is less than 50%, the occupancy rate of the Zn single phase on the surface of the plating layer is insufficient, and the adhesion with the adhesive by the MgO-based oxide may deteriorate. Meanwhile, in relation to the upper limit of the ratio of the Zn single phase on the surface of the plating layer, in the present disclosure, the higher the ratio of the Zn single phase, the more the adhesion with the adhesive may be improved, so the upper limit may not be separately limited. However, as an example, the ratio of the Zn single phase on the surface of the plating layer may be 90% or less. Meanwhile, in terms of further improving the above-described effect, the lower limit of the ratio of the Zn single phase on the surface of the plating layer may be 60%, or the upper limit of the ratio of the Zn single phase on the surface of the plating layer may be 81%.

In addition, the average diameter of the Zn single phase on the surface of the plating layer may be 3 to 20 μm. When the average diameter of the Zn single phase on the surface of the plating layer is less than 3 μm, the effect of improving adhesion may be insufficient, and when the average diameter of the Zn single phase exceeds 20 μm, the corrosion resistance may deteriorate.

In addition, although not particularly limited, most of the Zn single phase on the surface of the plating layer may have a spherical or elliptical shape. In this case, the spherical or elliptical shape does not mean only spherical or elliptical shapes with perfect shapes, nor does it mean that the shapes of all Zn single phases on the surface of the plating layer are spherical or elliptical. In other words, it may mean that, based on any one Zn single phase, 80% or more of the phase in which the ratio of the longest diameter and the shortest diameter is 0.8 to 1.2 is included.

In addition, although not particularly limited, according to an aspect of the present disclosure, the ratio of the Zn—$MgZn_2$ phase on the surface of the plating layer may be controlled to 10% or less (including 0%) as an area fraction. On the surface of the plating layer, the Zn—$MgZn_2$ phase, which is the binary eutectic structure, may act as a factor that worsens the adhesion with the adhesive due to its unique wrinkles. Therefore, in the present disclosure, the adhesion with the adhesive may be further improved by controlling the ratio of the Zn—$MgZn_2$ phase on the surface of the plating layer to be 10% or less. Meanwhile, in the present disclosure, the smaller the ratio of the Zn—$MgZn_2$ phase, which is the binary eutectic structure, on the surface of the plating layer, the better the characteristics, so the lower limit may not be separately limited. However, as an example, the ratio of the Zn—$MgZn_2$ phase on the surface of the plating layer may be 1% or more.

In addition, according to an aspect of the present disclosure, the ratio of the Zn—$MgZn_2$—Al phase on the surface of the plating layer may be 10 to 40% as an area fraction. The present inventors are not particularly limited, but as a result of intensive examination of factors affecting adhesion with adhesives resulting from the microstructure of the surface of the plating layer, it was found that it is more preferable to control the ratio of the Zn—$MgZn_2$—Al phase, which is a ternary eutectic structure, on the surface of the plating layer to be within an appropriate range as an area fraction. Specifically, when the ratio of the Zn—$MgZn_2$—Al phase on the surface of the plating layer is less than 10%, the ratio of the Zn—MgZn2 phase on the surface of the plating layer becomes too large, resulting in the problem in that the sealer adhesion is poor. In addition, when the ratio of the Zn—$MgZn_2$—Al phase exceeds 40% on the surface of the plating layer, the ratio of the Zn single phase to the Zn—$MgZn_2$—Al phase is insufficient on the surface of the plating layer, so the problem may arise in which it is difficult to expect the desired level of sealer adhesion.

Further, according to one aspect of the present disclosure, the ratio of the area of the Zn—$MgZn_2$ phase to the area of the Zn—$MgZn_2$—Al phase on the surface of the plating layer may be 1 to 4, and more preferably 1.2 to 4. As described above, since the microstructure on the surface of the plating layer may affect not only the ratio and size of the Zn single phase, but also the binary and ternary eutectic structures, in the present disclosure, it was confirmed that, the ratio of the binary eutectic structure and the ternary eutectic structure is controlled to be within an appropriate range, and as a result, the desired corrosion resistance and sealer adhesion may be further improved in the present disclosure.

Additionally, as a result of intensive examination, the inventors of the present disclosure found that the plating layer of the plated steel sheet according to one aspect of the present disclosure may include the Zn single phase grown in the columnar shape (pillar shape) based on the cross section in the thickness direction (meaning the direction perpendicular to the rolling direction of the steel sheet).

In this case, the Zn single phase grown in the columnar shape means the Zn single phase that contacts the surface line of the plating layer but does not contact the interface line between the plating layer and the inhibition layer, and may mean the Zn single phase in which, based on any one Zn single phase, the ratio Wa/Wb of the maximum size Wa measured in the thickness direction (meaning the direction perpendicular to the rolling direction of the steel sheet) and the length Wb occupied by the Zn single phase on the surface line of the plating layer exceeds 1.0 (preferably 1.02 or more and more preferably 1.2 or more).

Meanwhile, according to this aspect of the present disclosure, 50% or more of the Zn single phase in the plating layer may satisfy the above-described columnar shape. However, this does not mean that all Zn single phases grow in the columnar shape.

Accordingly, according to an aspect of the present disclosure, in the cross section of the plating layer, among all the Zn single phase, as a Zn single phase that contacts a surface line of the plating layer, but does not contact an interface line between the plating layer and the inhibition layer, the ratio of Zn single phase in which a ratio Wa/Wb of a maximum length Wa of the Zn single phase in the thickness direction and a length Wb of which the Zn single phase occupies the surface line of the plating layer exceeds 1.0 may be 50% or more.

By controlling the growth form of the Zn single phase to satisfy the above conditions, the Zn single phase is evenly distributed throughout in the thickness direction of the plating layer, and the binary and ternary eutectic structures are uniformly distributed between each Zn single phase, so the desired surface quality in the present disclosure may exhibit uniform characteristics, thereby securing the uniformity of quality.

Hereinafter, a method for manufacturing a plated steel sheet according to another aspect of the present disclosure will be described in detail. However, this does not mean that the plated steel sheet of the present disclosure should be manufactured by the following manufacturing method.

First, the base iron is prepared. The above description may be equally applied to the base iron. Subsequently, the base iron may be subjected to annealing heat treatment at a temperature of 800° C. or higher (more preferably 800° C. or higher and 850° C. or lower). When the annealing heat treatment temperature does not satisfy the above temperature range, a problem of material hardening may occur.

Then, based on the surface temperature of the base iron, the annealing heat-treated base iron is primarily cooled from 800° C. to 600° C. (i.e., in the temperature range of 800° C. to 600° C.) at an average cooling rate of 2 to 5° C./s. In this way, by controlling the cooling rate of the base iron before plating as described above, it is possible to uniformly control the structure of the base layer. Meanwhile, in terms of further improving uniformity, the lower limit of the average cooling rate during the primary cooling may be 4.3° C./s, or the upper limit of the average cooling rate during the primary cooling may be 5.0° C./s.

Next, based on the surface temperature of the base iron, the primary cooled base iron is secondarily cooled from 600° C. to the temperature of the plating bath (i.e., in the temperature range of 600° C. to the temperature of the plating bath (i.e., meaning the same temperature as the temperature of the plating bath)) at an average cooling rate of 25° C./s. In this way, by controlling the average cooling rate to be higher than the primary cooling condition during the secondary cooling, it may include a process of rapidly cooling the surface layer of the base iron to make a fine-sized ferrite phase denser on the surface of the base iron. In this way, by affecting the formation of the solidified phase of the subsequent molten plating layer, it is possible to effectively obtain the desired solidified phase structure in the present disclosure. Meanwhile, in terms of further improving the above-described effect, the lower limit of the average cooling rate during the secondary cooling may be 18° C./s, or the upper limit of the average cooling rate during the secondary cooling may be 20° C./s.

The secondary cooled base iron is immersed in the plating bath containing, by wt %, Mg: 1.0 to 2.0%, Al: 1.0 to 3.0%, a balance of Zn, and other unavoidable impurities, and is subjected to the hot-dip galvanizing. The description of the plating layer of the plated steel sheet described above is equally applied to the reason for adding each component and the reason for limiting the content in the plating bath.

Meanwhile, in order to manufacture the plating bath having the composition described above, a composite ingot containing predetermined Zn, Al, and Mg or a Zn—Mg and Zn—Al ingot containing individual components may be used. In this case, the description of the plating layer described above may be applied equally to the components of the plating bath, except for Fe introduced from the base iron.

In order to replenish the plating bath consumed by the hot-dip plating, the ingot is additionally melted and supplied. In this case, a method of dissolving an ingot by directly immersing the ingot in a plating bath may be adopted, or a method of dissolving an ingot in a separate pot and then replenishing molten metal in a plating bath may be adopted.

The temperature suitable for melting the above ingot is 440 to 520° C., and as the temperature of the plating bath increases, it is possible to secure the fluidity in the plating bath, form the uniform composition, and reduce the generation amount of floating dross. When the temperature of the plating bath is less than 440° C., the dissolution of the above ingot is very slow, and it is difficult to secure excellent plating layer surface quality because the plating bath has high viscosity. On the other hand, when the temperature of the plating bath exceeds 520° C., it is inappropriate to cause ash defects due to Zn evaporation on the plating surface. Most preferably, it is necessary to prepare for securing plating products by maintaining the temperature of the initial plating bath at about 500 to 520° C. to proceed with dissolution, and then completing plating bath stabilization at 440 to 480° C.

In addition, as the temperature of the plating bath, the normal temperature of the plating bath may be applied. In general, when the content of Al among the components in the plating bath increases, the melting point increases, so the equipment inside the plating bath may be eroded and the lifespan of the equipment is shortened, and the Fe alloy dross in the plating bath increases, so the surface of the plating material may be poor. However, in the present disclosure, since the content of Al is controlled to be relatively low at 1.0 to 3.0 wt %, there is no need to set the temperature of the plating bath high, and in the present disclosure, the temperature of the plating bath may be, for example, 440 to 480° C. Alternatively, in terms of further improving the above-described effect, the lower limit of the temperature of the plating bat may be 450° C., or the upper limit of the temperature of the plating bath may be 470° C.

According to an aspect of the present disclosure, the immersion time of the plating bath may be controlled to be in the range of 2 to 5 seconds, and the line speed may be 1 to 3 m/s. By controlling the plating to satisfy the above conditions, it is possible to inhibit the problem of non-uniformity of the plating surface.

Then, the zinc alloy plating steel material is gas-wiped to control the plating adhesion amount. The gas wiping treatment is for controlling the plating adhesion amount, and the method is not particularly limited. In this case, as the gas used, air, nitrogen, or argon may be used, and among these, nitrogen is more preferable in terms of economy and quality. When air is used, Mg oxidation preferentially occurs on the surface of the plating layer, which may cause the surface defects of the plating layer, and when argon is used, it costs a lot.

In this case, although not particularly limited, according to an aspect of the present disclosure, after the hot-dip galvanizing, it may further include gas wiping so that the adhesion amount on one side of the plating layer is in the range of 35 to 200 g/m$^2$ using nitrogen gas. By performing the gas wiping treatment to meet this requirement, it is possible to obtain a beautiful surface without oxidation defects. Meanwhile, in terms of further improving the above-described effect, the lower limit of the adhesion amount of one surface of the plating layer may be 120 g/m$^2$, or the upper limit of the adhesion amount of one surface of the plating layer may be 150 g/m$^2$.

Subsequently, the steel sheet with the hot-dip galvanized layer formed on the surface is extracted from the plating bath and tertiarily cooled at an average cooling rate of 6 to 20° C./s from 460° C. or lower (i.e., in the temperature range of 460° C. to 300° C.). In this case, the cooling end temperature is not particularly limited, and may be based on normal cooling conditions. Meanwhile, during the cooling, the cooling method is not particularly limited, and for example, cooling may be performed by using an air jet cooler or by spraying N$_2$ wiping, water fog, or the like. Meanwhile, in terms of further improving the above-described effect, the lower limit of the average cooling rate during the tertiary cooling may be 10° C./s (more preferably, 15° C./s), or the upper limit of the average cooling rate during the tertiary cooling may be 19° C./s.

MODE FOR INVENTION

Example

Hereinafter, the present disclosure will be described in more detail with reference to Examples. However, it should be noted that the following Examples are only for illustrating the present disclosure in more detail and are not intended to limit the scope of the present disclosure. This is because the scope of the present disclosure is determined by the matters described in the claims and the matters reasonably inferred therefrom.

Experimental Example 1

As a test piece for plating, after a low-carbon cold-rolled steel sheet having a thickness of 0.8 mm, a width of 100 mm, and a length of 200 mm, and containing, by wt %, C: 0.025%, Si: 0.03%, Mn: 0.15%, P: 0.01%, S: 0.003%, Al: 0.03%, the balance Fe, and other unavoidable impurities is prepared as a base steel sheet, the base steel sheet was immersed in acetone and ultrasonically washed to remove foreign substances such as rolling oil remaining on a surface. Thereafter, heat treatment in a reducing atmosphere at 800° C. was performed to secure mechanical properties of the steel sheet at a general hot-dip plating site, followed by two-step cooling (primary cooling-secondary cooling) before plating under the conditions shown in Table 1 below. In this case, a difference between temperature rising and cooling curves of Inventive Example 1 and Comparative Example 1 is illustrated in FIG. 1.

Subsequently, after two-step cooling before plating, the base iron was immersed in a plating bath (plating bath temperature: 460° C.) having compositions shown in Table 1 below, plated, and then cooled to manufacture a plated steel sheet. Thereafter, the zinc alloy plated steel material was gas-wiped to control a plating adhesion amount to 140 g/m$^2$ per side.

Meanwhile, in the case of Inventive Example, after the temperature rising, tertiary cooling was performed after the base iron enters the plating bath after the primary and secondary cooling. In the case of Comparative Example, after the temperature was raised, the primary cooling was performed, and then the secondary cooling was performed after the base iron enters the plating bath.

For each plated steel sheet thus obtained, the plating layer was dissolved in a hydrochloric acid solution, and then the dissolved liquid was analyzed by a wet analysis (ICP) method to measure the content (wt %) of each component, which was shown in Table 2 below.

In addition, after taking a cross-section of each manufactured plated steel sheet cut in a thickness direction (meaning a direction perpendicular to a rolling direction) with a scanning electron microscope (SEM), and observing the taken photograph, it was confirmed that a Zn—Mg—Al-based plating layer is formed on the base iron and a Fe—Al-based inhibition layer, which meets a composition containing, by wt %, Fe: 30-50% and Al: 50-70%, is formed between the base iron and the Zn—Mg—Al-based plating layer. In addition, a thickness of the Fe—Al-based inhibition layer was measured using the taken photograph, and it was confirmed that the thickness was in the range of 20 to 100 nm.

Then, after observing the surface structure of each manufactured plated steel sheet with a field emission-scanning electron microscope (FE-SEM, SUPRA-55VP, ZEISS) image, a diameter of a major axis of a cross-sectional structure and a surface fraction of a Zn single phase and were measured through an image analysis system (analyser). Distribution and columnar phase in the plating layer of the Zn single phase were observed through the FE-SEM analysis of the cross-sectional plating layer. The columnar shape was defined as the Zn single phase having a large length in the thickness direction of the plating layer compared to the surface of the Zn single phase.

FIG. 2 is a SEM 700-fold image of a surface of a plated layer according to Inventive Example 1 and FIG. 3 is an SEM 700-fold image of the surface of the plated layer according to Comparative Example 1. In addition, FIG. 4 is a FE-SEM 1,000-fold image of a cross section of the plated layer according to Inventive Example 1 and FIG. 5 is a FE-SEM 1,000-fold image of a cross section of a plated layer according to Comparative Example 1.

Thereafter, the adhesion of the manufactured zinc alloy plated steel material with the adhesive was evaluated, and the results were shown in Table 1 below. To evaluate the adhesion with the adhesive, a lab shear test was performed using the reinforced D-type structural adhesive #SA-1402D. In the Lab shear test, adhesive is applied between two iron plates (adhesion area: 10 mm×25 mm) with a thickness of 2 mm and then attached, and after proceeding at 170° C. for 20 minutes, tensile evaluation was performed and a fracture surface at that time was observed to separately evaluate adhesive failure and cohesive failure.

When an adhesive force between the adhesive and the steel sheet is strong, the cohesive failure occurs between the adhesives, but when the adhesive force between the adhesive and the steel sheet is weak, the adhesive failure occurs. In addition, the tensile strength was measured during the lab shear test and shown in Table.

The grades according to the evaluation criteria of the adhesion are as follows.
  5: Cohesive failure of 90% or more
  4: Cohesive failure of 70% or more+adhesive failure of 30% or less
  3: Cohesive failure of 50% or more+adhesive failure of 50% or less
  2: Cohesive failure of 30% or less+adhesive failure of 70% or more
  1: Adhesive failure of 90% or more Table 2 showed the ratio (%) of the surface structure of the Zn single phase, average particle diameter (μm) of the surface structure of the Zn single phase, Lab Shear Test result (grade), and Lab shear tensile strength (MPa) as the result thereof.

TABLE 1

| | Composition of Plating Bath (wt %) | | Before Plating | | After Plating | |
| | | | Primary Average Cooling Rate | Secondary Average Cooling Rate | Tertiary Average Cooling Rate | |
| No. | Mg | Al | (800→600° C.) | (600→460° C.) | (460→300° C.) | Remarks |
| 1 | 1.2 | 1.6 | 5 | 20 | 17 | Inventive Example 1 |

TABLE 1-continued

| | Composition of Plating Bath (wt %) | | Before Plating | | After Plating Tertiary Average Cooling Rate | |
|---|---|---|---|---|---|---|
| | | | Primary Average Cooling Rate | Secondary Average Cooling Rate | | |
| No. | Mg | Al | (800→600° C.) | (600→460° C.) | (460→300° C.) | Remarks |
| 2 | 1.2 | 1.6 | 5 | 17 | 14 | Inventive Example 2 |
| 3 | 1.2 | 1.6 | 4 | 15 | 12 | Inventive Example 3 |
| 4 | 1.2 | 1.6 | 3 | 12 | 10 | Inventive Example 4 |
| 5 | 1.2 | 1.6 | 5 | — | 8 | Comparative Example 1 |
| 6 | 1.2 | 1.6 | 3 | — | 10 | Comparative Example 2 |
| 7 | 1.2 | 1.6 | 4 | — | 13 | Comparative Example 3 |
| 8 | 1.2 | 1.6 | 5 | — | 17 | Comparative Example 4 |
| 9 | 1.2 | 1.6 | 5 | 8 | 8 | Comparative Example 5 |
| 10 | 1.2 | 1.6 | 3 | 11 | 10 | Comparative Example 6 |
| 11 | 1.2 | 1.6 | 4 | 12 | 4 | Comparative Example 7 |
| 12 | 1.2 | 1.6 | 4 | 13 | 5 | Comparative Example 8 |

TABLE 2

| | Composition of Plating Layer (wt %, a balance of Zn) | | Area Ratio of Zn Single Phase | Average Diameter Size of Surface of Zn Single Phase | Whether Columnar Shape is included in Plating Layer of Zn Single Phase | Lab Shear Test | Lab Shear Tensile | |
|---|---|---|---|---|---|---|---|---|
| No | Mg | Al | (%) | (μm) | | Grade | Strength | Remarks |
| 1 | 1.2 | 1.6 | 72 | 7 | ○ | 5 | 21.2 | Inventive Example 1 |
| 2 | 1.2 | 1.6 | 68 | 9 | ○ | 5 | 20.8 | Inventive Example 2 |
| 3 | 1.2 | 1.6 | 62 | 10 | ○ | 5 | 19.4 | Inventive Example 3 |
| 4 | 1.2 | 1.6 | 50 | 15 | ○ | 5 | 18.2 | Inventive Example 4 |
| 5 | 1.2 | 1.6 | 35 | 30 | X | 1 | 2.0 | Comparative Example 1 |
| 6 | 1.2 | 1.6 | 38 | 19 | X | 2 | 5.0 | Comparative Example 2 |
| 7 | 1.2 | 1.6 | 39 | 18 | X | 2 | 5.0 | Comparative Example 3 |
| 8 | 1.2 | 1.6 | 40 | 23 | X | 2 | 7.0 | Comparative Example 4 |
| 9 | 1.2 | 1.6 | 42 | 25 | X | 2 | 7.2 | Comparative Example 5 |
| 10 | 1.2 | 1.6 | 48 | 18 | X | 4 | 14.8 | Comparative Example 6 |
| 11 | 1.2 | 1.6 | 53 | 2 | X | 4 | 6.8 | Comparative Example 7 |
| 12 | 1.2 | 1.6 | 52 | 23 | X | 3 | 15.0 | Comparative Example 8 |

As can be seen in Table 2 above, in the case of Inventive Examples 1 to 4, which meet all of the compositions and manufacturing conditions of the plating layer of the present disclosure, the Lab shear test grade is high, the Lab shear tensile strength is high, so it was confirmed that the adhesion with the adhesive is very excellent.

On the other hand, in the case of Comparative Examples 1 to 12, which did not meet at least one of the compositions and manufacturing conditions of the plating layer of the present disclosure, at least one of the Lab shear test grade and Lab shear tensile strength was low, so it was confirmed that the adhesion with the adhesive was poor.

Experimental Example 2

Except for changing the experimental conditions to Tables 3 and 4, when hot-dip galvanizing, after immersed for 3 seconds at a line speed of 2 m/s, except for applying gas wiping using nitrogen gas so that an adhesion amount on one side of the plating layer is in a range of 130 g/m², a plated steel sheet was manufactured in the same manner as in Experimental Example 1 described above and then evaluated, which was shown in Table 4 below.

TABLE 3

| | Composition of Plating Bath (wt %) | | | | Before Plating | | After Plating | |
|---|---|---|---|---|---|---|---|---|
| | | | | | Primary Average Cooling Rate | Secondary Average Cooling Rate | Tertiary Average Cooling Rate | |
| No. | Mg | Al | Mg/Al | (800→600° C.) | (600→460° C.) | (460→300° C.) | Remarks |
| A | 1.2 | 1.8 | 0.67 | 5 | 20 | 17 | Inventive Example 5 |
| B | 1.8 | 2.0 | 0.72 | 5 | 20 | 17 | Inventive Example 6 |
| C | 2.0 | 2.5 | 0.80 | 5 | 20 | 17 | Inventive Example 7 |
| D | 1.3 | 1.5 | 0.87 | 5 | 20 | 17 | Inventive Example 8 |
| E | 1.4 | 1.6 | 0.88 | 5 | 20 | 17 | Inventive Example 9 |
| F | 1.8 | 2.0 | 0.94 | 5 | 20 | 17 | Comparative Example 9 |
| G | 1.6 | 1.6 | 1.00 | 5 | 20 | 17 | Comparative Example 10 |
| H | 1.8 | 1.4 | 1.29 | 5 | 20 | 17 | Comparative Example 11 |
| I | 1.7 | 1.2 | 1.42 | 5 | 20 | 17 | Comparative Example 12 |

Additionally, in order to evaluate the uniformity of the plated steel sheet obtained from Inventive Example and Comparative Example, respectively, evaluation was performed based on the following criteria, and the results were shown in Table 4.

○: No non-plating defects on the surface
x: Existence of non-plating defects on the surface

TABLE 4

| | Composition of Plating Layer (wt %, a balance of Zn) | | | Surface of Plating Layer | | Cross Section of Plating Layer Whether Columnar Shape is included in Plating Layer of | | | | |
|---|---|---|---|---|---|---|---|---|---|---|
| | | | | Area Ratio of Zn Single Phase (%) | Average Diameter Size of Surface of Zn Single Phase (μm) | | | Lab Shear Test Grade | Lab Shear Tensile Strength (MPa) | |
| No | Mg | Al | Mg/Al | | | Zn Single Phase | Uniformity | | | Remarks |
| A | 1.2 | 1.8 | 0.67 | 81 | 3 | ○ | ○ | 5 | 25.2 | Inventive Example 5 |
| B | 1.8 | 2.0 | 0.72 | 78 | 4 | ○ | ○ | 5 | 24.3 | Inventive Example 6 |

TABLE 4-continued

| | Composition of Plating Layer (wt %, a balance of Zn) | | | Surface of Plating Layer | | Cross Section of Plating Layer Whether Columnar Shape is included in Plating Layer of | | | | |
|---|---|---|---|---|---|---|---|---|---|---|
| | | | | Area Ratio of Zn Single Phase | Average Diameter Size of Surface of Zn Single Phase | | | Lab Shear Test | Lab Shear Tensile Strength | |
| No | Mg | Al | Mg/Al | (%) | (μm) | Zn Single Phase | Uniformity | Grade | (MPa) | Remarks |
| C | 2.0 | 2.5 | 0.80 | 70 | 5 | ○ | ○ | 5 | 21.0 | Inventive Example 7 |
| D | 1.3 | 1.5 | 0.87 | 65 | 6 | ○ | ○ | 5 | 19.6 | Inventive Example 8 |
| E | 1.4 | 1.6 | 0.88 | 60 | 10 | ○ | ○ | 5 | 19.2 | Inventive Example 9 |
| F | 1.8 | 2.0 | 0.94 | 41 | 12 | X | X | 3 | 17.6 | Comparative Example 9 |
| G | 1.6 | 1.6 | 1.00 | 30 | 10 | X | X | 2 | 6.5 | Comparative Example 10 |
| H | 1.8 | 1.4 | 1.29 | 21 | 12 | X | X | 2 | 5.7 | Comparative Example 11 |
| I | 1.7 | 1.2 | 1.42 | 12 | 8 | X | X | 1 | 1.6 | Comparative Example 12 |

As can be seen in Table 4 above, in the case of Inventive Examples 5 to 9, which meet all of the compositions and manufacturing conditions of the plating layer of the present disclosure, the Lab Shear Test grade is high, the Lab shear tensile strength is high, so it was confirmed that the adhesion with the adhesive is very excellent.

In this case, in the case of Inventive Examples 5 to 9, it was confirmed that the ratio of the Zn—$MgZn_2$ phase on the surface of the plating layer is 10% or less as an area fraction, the ratio of the Zn—$MgZn_2$—Al phase on the surface of the plating layer is 10 to 40% as an area fraction, and the ratio of the area of the Zn—$MgZn_2$ phase and the area of the Zn—$MgZn_2$—Al phase on the surface of the plating layer is 1.2 to 4.

In addition, through the SEM picture in which the cross section of the plated steel sheet is observed, in the cross section of the plating layer in the thickness direction (meaning the direction perpendicular to the rolling direction), among all the Zn single phases, as a Zn single phase that contacts a surface line of the plating layer, but does not contact an interface line between the plating layer and the inhibition layer, and it was confirmed that the ratio of Zn single phase in which a ratio Wa/Wb of a maximum length Wa of the Zn single phase in the thickness direction and a length Wa of which the Zn single phase occupies the surface of the plating layer exceeds 1.0 is 50%.

On the other hand, in the case of Comparative Examples 9 to 12, which did not meet at least one of the compositions and manufacturing conditions of the plating layer of the present disclosure, at least one of the Lab shear test grade and Lab shear tensile strength was low, so it was confirmed that the adhesion with the adhesive was poor, and the plating crackability was also poor.

The invention claimed is:

1. A plated steel sheet, comprising:
   base iron;
   a Zn—Mg—Al-based plating layer provided on at least one surface of the base iron; and
   a Fe—Al-based inhibition layer provided between the base iron and the Zn—Mg—Al-based plating layer,
   wherein the plating layer contains, by wt %, Mg: 1.0 to 2.0%, Al: 1.0 to 3.0%, a balance of Zn, and other unavoidable impurities,
   a ratio of a Zn single phase on a surface of the plating layer is 50% or more as an area fraction,
   an average diameter of the Zn single phase on the surface of the plating layer was 3 to 20 μm,
   the plating layer has a Zn—$MgZn_2$ phase and Zn—$MgZn_2$—Al phase,
   the plating layer includes a Zn single phase that contacts a surface line of the plating layer, but does not contact an interface line between the plating layer and the inhibition layer, based on a cross section in a thickness direction, and
   the Zn single phase in which a ratio Wa/Wb of a maximum length Wa of the Zn single phase in the thickness direction and a length Wb of which the Zn single phase occupies the surface of the plating layer exceeds 1.0.

2. The plated steel sheet of claim 1, wherein a ratio of the Zn—$MgZn_2$ phase on the surface of the plating layer is 10% or less (including 0%) as an area fraction.

3. The plated steel sheet of claim 1, wherein a ratio of the Zn—$MgZn_2$—Al phase on the surface of the plating layer is 10 to 40% as an area fraction.

4. The plated steel sheet of claim 1, wherein a ratio of an area of the Zn—$MgZn_2$ phase and an area of the Zn—$MgZn_2$—Al phase on the surface of the plating layer is 1 to 4.

* * * * *